(12) United States Patent
Sakurai et al.

(10) Patent No.: US 11,407,450 B2
(45) Date of Patent: Aug. 9, 2022

(54) REINFORCEMENT FOR A VEHICLE

(71) Applicant: TOYOTA JIDOSHA KABUSHIKI KAISHA, Aichi-ken (JP)

(72) Inventors: Kosuke Sakurai, Nisshin (JP); Hiroyuki Kurokawa, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/137,249

(22) Filed: Dec. 29, 2020

(65) Prior Publication Data

US 2021/0229749 A1 Jul. 29, 2021

(30) Foreign Application Priority Data

Jan. 24, 2020 (JP) .............................. JP2020-010343

(51) Int. Cl.
*B62D 25/06* (2006.01)
*B62D 29/04* (2006.01)

(52) U.S. Cl.
CPC ............ *B62D 25/06* (2013.01); *B62D 29/043* (2013.01); *B62D 29/04* (2013.01)

(58) Field of Classification Search
CPC ........ B62D 25/00; B62D 25/06; B62D 29/04; B62D 29/043; B62D 33/0222
USPC .. 296/29, 187.01, 203.01, 203.03, 205, 102, 296/120, 122, 210
See application file for complete search history.

(56) References Cited

U.S. PATENT DOCUMENTS

| 5,174,844 A | 12/1992 | Tong | |
|---|---|---|---|
| 2001/0033096 A1* | 10/2001 | Hanyu | B62D 21/15 296/203.01 |
| 2003/0175455 A1* | 9/2003 | Erb | B32B 1/08 428/36.1 |

FOREIGN PATENT DOCUMENTS

| DE | 102011100050 A1 * | 10/2012 | ............ B62D 25/06 |
|---|---|---|---|
| JP | S63246229 A | 10/1988 | |
| JP | 3559117 B * | 8/2004 | ............ B21C 37/15 |
| JP | 2005263114 A * | 9/2005 | ............ B60R 19/04 |
| JP | 2008173782 A * | 7/2008 | ............ B62D 25/06 |
| JP | 201099411 A | 5/2010 | |
| JP | 2011224939 A | 11/2011 | |
| JP | 2015205533 A * | 11/2015 | ............ B62D 25/04 |
| JP | 201843713 A | 3/2018 | |

OTHER PUBLICATIONS

Lothar et al. , "Support element for a motor vehicle body", Oct. 31, 2012, German Patent Office, Edition: DE102011100050 (Year: 2012).*

(Continued)

*Primary Examiner* — Dennis H Redder
*Assistant Examiner* — Joyce Eileen Hill
(74) *Attorney, Agent, or Firm* — Hauptman Ham, LLP

(57) ABSTRACT

There is provided a reinforcement for a vehicle having a main body portion that is formed in a hollow beam shape, and extends in a vehicle width direction while having both end portions thereof in the vehicle width direction supported by structural components of a vehicle, and whose cross-sectional surface area in a vehicle front-rear direction becomes progressively larger from the end portions in the vehicle width direction towards a central portion thereof.

11 Claims, 7 Drawing Sheets

(56) References Cited

OTHER PUBLICATIONS

Tamura et. al., "To provide a vehicular reinforcing member and manufacturing method thereof", Aug. 25, 2004, Japanese Patent Office, Edition: JP3559117B (Year: 2004).*
Nakayama et al., "Vehicle Body Rear Part Structure of Automobile", Sep. 25, 2005, Japanese Patent Office, Edition: JP2005263114A (Year: 2005).*
Yoshimoto et al., "Vehicular Roof Reinforcement", Nov. 19, 2015, Japanese Patent Office, Edition: JP2015205533 (Year: 2015).*
Moriyama, "Hollow Structure", Jul. 31, 2008. Japanese Patent Office, Edition: JP2008173782A (Year: 2008).*

* cited by examiner

REINFORCEMENT FOR A VEHICLE

CROSS-REFERENCE TO RELATED APPLICATION

This application is based on and claims priority under 35 USC 119 from Japanese Patent Application No. 2020-010343 filed on Jan. 24, 2020, the disclosure of which is incorporated by reference herein.

BACKGROUND

Technical Field

The present disclosure relates to a reinforcement for a vehicle.

Related Art

A reinforcement that reinforces a roof portion of a vehicle body (i.e., a roof reinforcement) is disclosed in Japanese Unexamined Patent Application Laid-Open (JP-A) No. 2018-043713. This reinforcement is formed by a plate-shaped metal material that has been press-molded so as to have a uniform plate thickness. This reinforcement extends in a vehicle width direction so as to bridge a gap between structural components such as roof side-rails and the like.

In order to achieve a reduction in weight, in some cases, a reinforcement for a vehicle may be formed in a hollow pillar shape. In such cases, stress is concentrated in a central portion in the vehicle width direction of the reinforcement due to bending moment that is generated in end portions in the vehicle width direction of the reinforcement. Because of this, it is desirable that the bending rigidity and bending strength of the central portion of the reinforcement be increased.

SUMMARY

In view of the above-described circumstances, it is an object of the present disclosure to provide a reinforcement for a vehicle that makes it possible to achieve a reduction in weight while ensuring bending rigidity and bending strength.

A reinforcement for a vehicle according to a first aspect of the present disclosure is provided with a main body portion that is formed in a hollow beam shape, and extends in a vehicle width direction while having both end portions thereof in the vehicle width direction supported by structural components of a vehicle, and whose cross-sectional surface area in a vehicle front-rear direction becomes progressively larger from the end portions in the vehicle width direction towards a central portion thereof.

The reinforcement for a vehicle according to the first aspect is provided with a main body portion that is formed in the shape of a hollow beam. Because of this, compared with a reinforcement that is formed in a plate shape, it is possible, while inhibiting any increase in plate thickness, to guarantee cross-sectional rigidity and also achieve a reduction in weight.

The main body portion of the reinforcement for a vehicle extends in the vehicle width direction, and both end portions thereof in the vehicle width direction are supported by structural components of the vehicle. In other words, the main body portion bridges the gap between the structural components of the vehicle body in the vehicle width direction. Because of this, bending moment is generated in the end portions in the vehicle width direction of the main body portion, and stress becomes concentrated in the central portion thereof. Here, the main body portion is formed such that an area of a cross-section thereof taken across the vehicle front-rear direction becomes progressively larger from the end portions in the vehicle width direction towards a central portion thereof. As a result of this, a structure is created in which it is possible, while inhibiting any increase in the weight of the main body portion, to efficiently increase the bending rigidity and bending strength of this central portion where the stress is concentrated.

A reinforcement for a vehicle body according to a second aspect is characterized in that, in the structure described in the first aspect, a first partition wall portion whose plate thickness direction extends substantially in the vehicle width direction, and that partitions an internal portion of the main body portion into one side and another side in the vehicle width direction, is provided at the central portion in the vehicle width direction of the main body portion.

In the reinforcement for a vehicle according to the second aspect, a first partition wall portion is provided in the central portion in the vehicle width direction of the main body portion. This first partition wall portion is disposed such that the plate thickness direction thereof extends substantially in the vehicle width direction, and is formed so as to partition an internal portion of the main body portion into one side and another side in the vehicle width direction. As a result, the bending rigidity and bending strength of the central portion of the main body portion are strengthened by the first partition wall, and it is possible to efficiently reinforce the portion where the stress is concentrated.

A reinforcement for a vehicle according to a third aspect is characterized in that, in the structure described in the first aspect or second aspect, at least one rib is provided at the internal portion of the main body portion extending in the vehicle width direction from one end portion to another end portion in the vehicle width direction.

At least one rib is provided at the internal portion of the main body portion forming the reinforcement for a vehicle according to the third aspect so as to extend in the vehicle width direction from one end portion in the vehicle width direction to another end portion in the vehicle width direction. As a result, it is possible to increase the bending rigidity and bending strength of the entire main body portion.

A reinforcement for a vehicle according to a fourth aspect is characterized in that, in the structure described in any one of the first aspect through the third aspect, a second partition wall portion that partitions an internal portion of the main body portion is provided at the internal portion of the main body portion extending in the vehicle width direction from one end portion to another end portion in the vehicle width direction.

In the reinforcement for a vehicle according to the fourth aspect, the internal portion of the main body portion is partitioned by a second partition wall portion that is provided extending in the vehicle width direction from one end portion to another end portion in the vehicle width direction. As a result, it is possible to increase the cross-sectional rigidity of the entire main body portion.

A reinforcement for a vehicle according to a fifth aspect is characterized in that, in the structure described in any one of the first aspect through the fourth aspect, the main body portion is formed such that an outer configuration and a size of a cross-section thereof taken along the vehicle front-rear direction remain substantially uniform.

In the reinforcement for a vehicle according to the fifth aspect, the main body portion is formed such that an outer configuration and a size of a cross-section thereof taken along the vehicle front-rear direction remain substantially uniform. As a result, there is no increase in the complexity of the overall configuration, and the design can remain simple.

A reinforcement for a vehicle according to a sixth aspect is characterized in that, in the structure described in any one of the first aspect through the fifth aspect, the main body portion is molded using a resin material containing discontinuous fibers as a reinforcing material.

In the reinforcement for a vehicle according to the sixth aspect, the main body portion is molded using a resin material containing discontinuous fibers as a reinforcing material. Because of this, the main body portion of the reinforcement for a vehicle can be integrally molded using an SMC molding process. Consequently, it becomes easy to gradually change the area of the cross-section of the main body portion to match a desired position in the vehicle width direction. As a result, not only is it possible to stably increase the bending rigidity and bending strength of the central portion of the main body portion, but it is also possible to produce the reinforcement for a vehicle at low cost.

A reinforcement for a vehicle according to a seventh aspect is characterized in that, in the structure described in any one of the first aspect through the sixth aspect, the structural component of the vehicle is formed by a pair of roof side-rails that extend in the vehicle front-rear direction, and that are disposed a predetermined distance apart from each other in the vehicle width direction, and both end portions in the vehicle width direction of the main body portion are supported by the roof side-rails, so that the main body portion reinforces a roof of the vehicle.

In the reinforcement for a vehicle according to the seventh aspect, both end portions in the vehicle width direction of the main body portion are supported by a pair of roof side-rails. As a result, because it is thereby possible to reinforce the roof of a vehicle using the reinforcement for a vehicle, it is possible to efficiently reinforce the roof while inhibiting any increase in the weight of the roof.

As has been described above, the reinforcement for a vehicle according to the first aspect has the excellent effect of making it possible to achieve a reduction in weight while guaranteeing bending rigidity and bending strength.

The reinforcement for a vehicle according to the second aspect has the excellent effect of making it possible to efficiently strengthen the central portion in the vehicle width direction.

The reinforcement for a vehicle according to the third aspect has the excellent effect of making it possible to increase the overall bending rigidity and bending strength.

The reinforcement for a vehicle according to the fourth aspect has the excellent effect of making it possible to increase the overall cross-sectional rigidity.

The reinforcement for a vehicle according to the fifth aspect has the excellent effect of making it possible to employ a simple configuration and thereby simplify the design.

The reinforcement for a vehicle according to the sixth aspect has the excellent effect of making it possible to stably increase the bending rigidity and bending strength of the central portion, and to also produce the reinforcement for a vehicle at low cost.

The reinforcement for a vehicle according to the seventh aspect has the excellent effect of making it possible to efficiently reinforce the roof of the vehicle while inhibiting any increase in the weight of this roof.

BRIEF DESCRIPTION OF THE DRAWINGS

Exemplary embodiments of the present invention will be described in detail based on the following figures, wherein.

DETAILED DESCRIPTION

Figure 1:
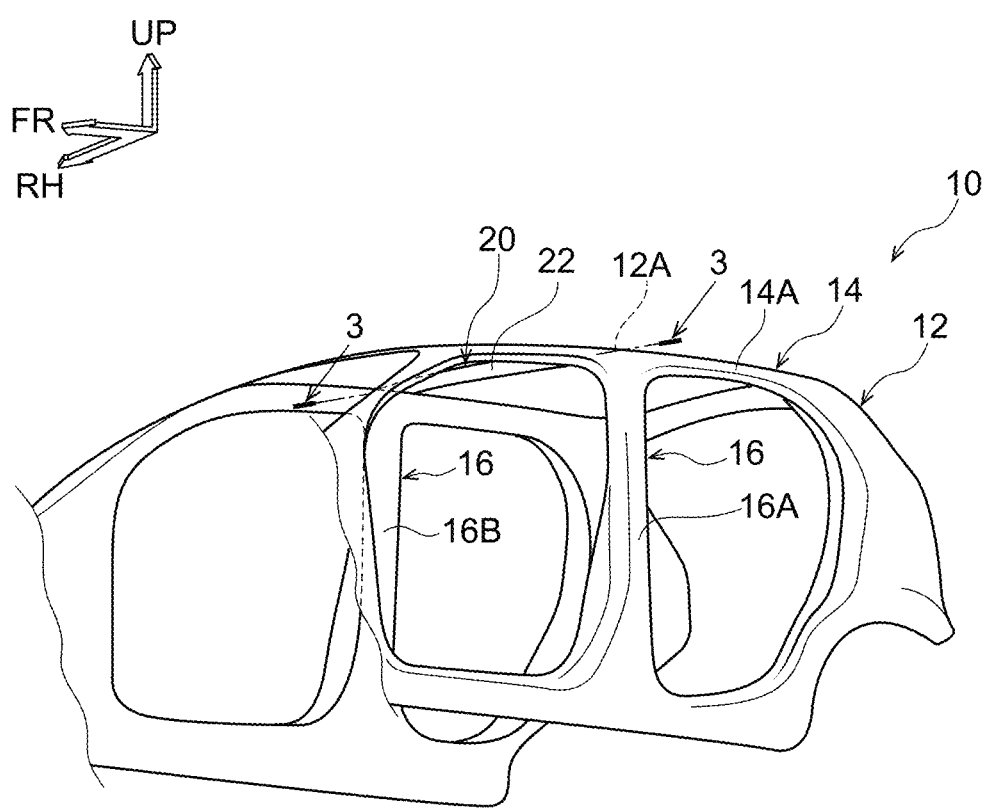
FIG. 1 is a perspective view schematically showing a vehicle in which a reinforcement for a vehicle according to a first exemplary embodiment has been applied.

Hereinafter, a roof reinforcement 20 serving as a reinforcement for a vehicle according to the present exemplary embodiment will be described using FIG. 1 through FIG. 5. Note that an arrow UP, an arrow FR, and an arrow RH that are shown in the appropriate drawings respectively indicate a vehicle upward direction, a vehicle forward direction, and a vehicle right-side direction. Hereinafter, if front-rear, left-right, or up-down directions are used in the following description, then, unless specifically stated otherwise, these refer respectively to the front-rear directions of the vehicle, the left-right directions of the vehicle (i.e., the vehicle width direction) relative to a direction of forward travel, and the up-down directions of the vehicle.

As is partially shown in FIG. 1, the roof reinforcement (referred to below as a roof R/F) 20 is formed as a reinforcing component that reinforces a roof 12A of a vehicle 10. This vehicle 10 has a body 12 that forms part of an upper portion of the vehicle 10. A pair of roof side-rails 14 which serve as structural components are disposed in the roof 12A that forms a roof portion of the body 12.

The pair of roof side-rails 14 form a part of the structural components of the roof 12A, and are disposed a predetermined distance apart from each other in the vehicle width direction and extending longitudinally in the vehicle front-rear direction. Each roof side-rail 14 has a closed cross-sectional structure that is formed by joining together a roof side outer 14A and a roof side inner 14B (see FIG. 2), which are made from steel plates, so that together they form a hollow beam structure. An upper end portion of a pillar 16 that forms part of a structural component in the center of the body 12 is joined to an intermediate portion of each roof side-rail 14. Each pillar 16 has a closed cross-sectional structure that is formed by joining together a pillar outer 16A and a pillar inner 16B (see FIG. 2), which are made from steel plates, so that together they form a hollow beam structure that extends substantially in the vehicle up-down direction. A lower end portion of each pillar 16 is joined to a rocker (no symbol is shown for this in the drawings).

As is shown in FIG. 1, the roof R/F 20 that, together with the roof side-rail 14A, forms part of the structural components of the roof 12A is joined to the intermediate portion of the pair of roof side-rails 14. The roof R/F 20 is provided with a main body portion 22 that is formed in the shape of a hollow beam. The main body portion 22 extends in the vehicle width direction and bridges the gap between the pair of left and right roof side-rails 14. As a result, both end portions in the vehicle width direction of the main body portion 22 are supported by the pair of roof side-rails 14. In addition, the main body portion 22 of the present exemplary embodiment is gently curved so as to protrude towards the vehicle upper side in a central portion thereof in the vehicle width direction.

Figure 2:
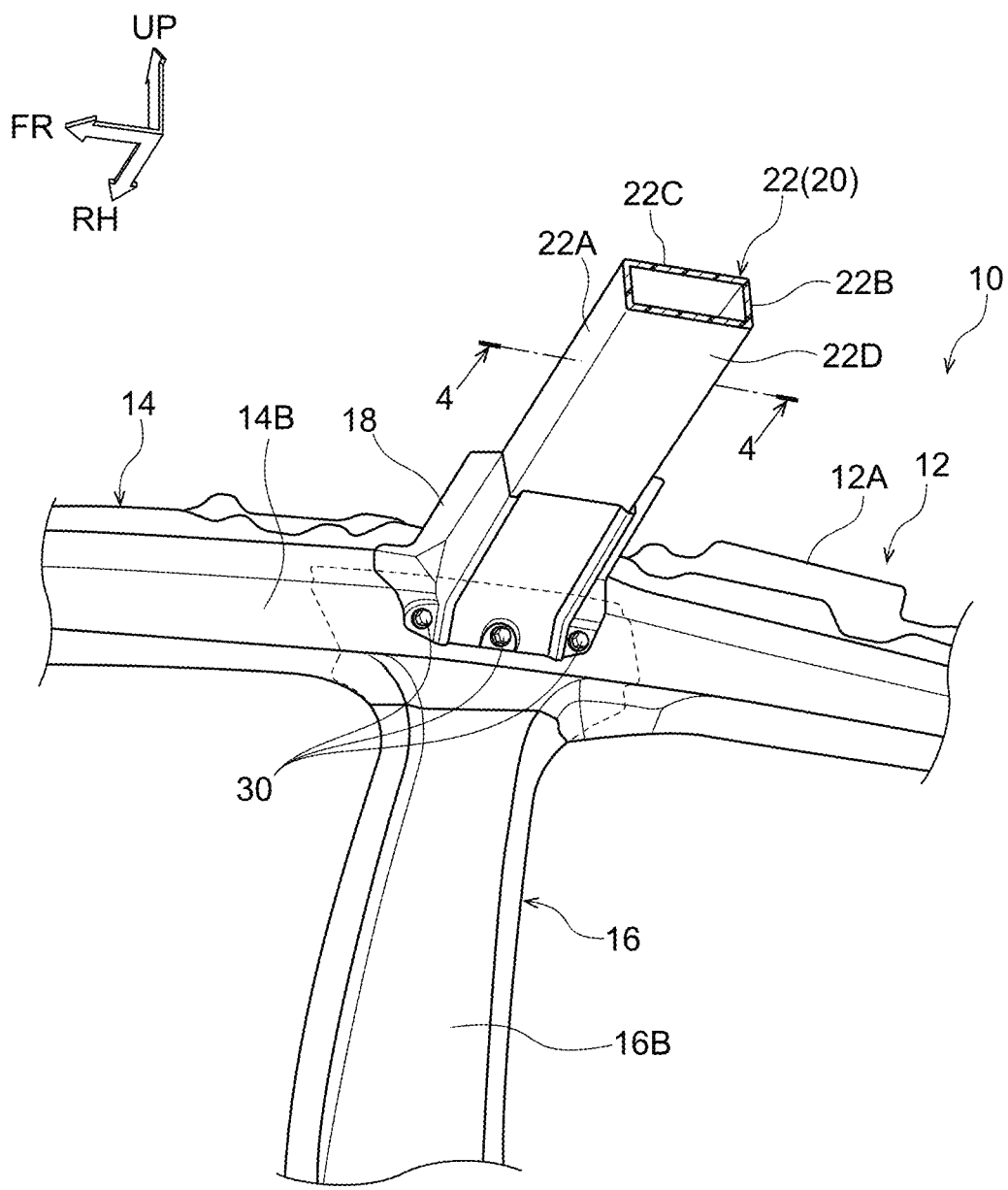
FIG. 2 is a partial perspective view showing an enlargement of an end portion in the vehicle width direction of the reinforcement for a vehicle shown in FIG. 1.

As is shown in FIG. 2, end portions in the vehicle width direction of the main body portion 22 are joined to the roof side-rails 14 via joining components 18 that are made from steel plate. Each joining component 18 is fixed to the main body portion 22 using bolts 30, and is also fixed to the roof side inner 14B of each roof side-rail 14 either by bolts or via welding or the like. Furthermore, the upper end portion of each pillar 16 is also fixed to the joining components 18 either by bolts or via welding or the like. As a result, the roof R/F 20 and the pillars 16 are joined together via the joining components 18 and the roof side-rails 14.

Figure 4:
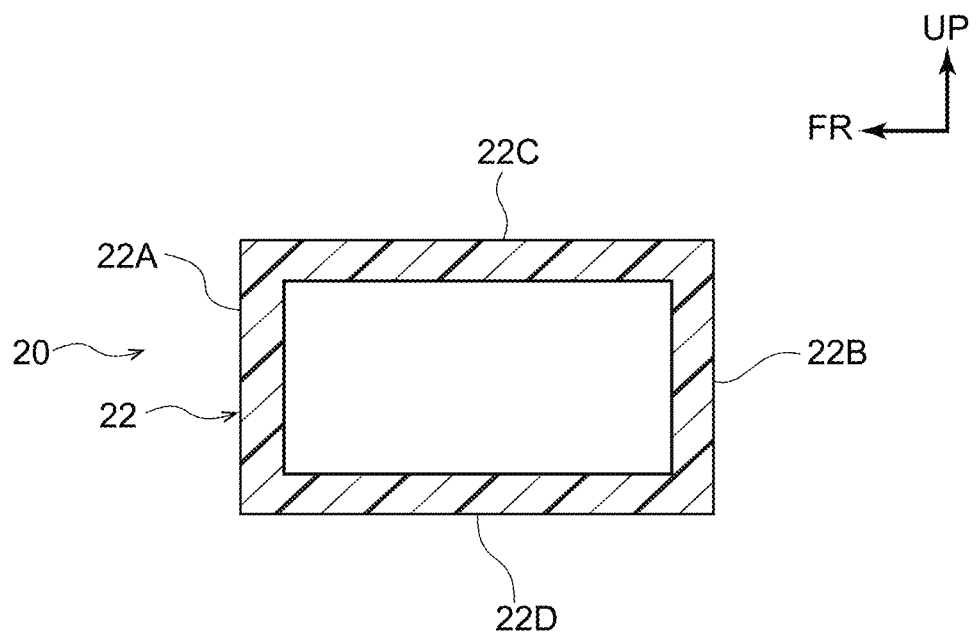
FIG. 4 is a cross-sectional view showing a state across a line 4-4 shown in FIG. 2 of the reinforcement for a vehicle.

As is shown in FIG. 2 and FIG. 4, the main body portion 22 is formed in a hollow beam shape whose cross-section in the vehicle front-rear direction is formed as a substantially rectangular closed cross-section. More specifically, the main body portion 22 is formed by a front wall portion 22A, a rear wall portion 22B, an upper wall portion 22C, and a lower wall portion 22D. The front wall portion 22A forms a wall on the vehicle front side of the main body portion 22. The rear wall portion 22B is disposed opposite the front wall portion 22A, and forms a wall on the vehicle rear side of the main body portion 22. The upper wall portion 22C forms a wall on the vehicle upper side of the main body portion 22, and connects upper ends of the front wall portion 22A and the rear wall portion 22B together in the vehicle front rear direction. The lower wall portion 22D forms a wall on the vehicle lower side of the main body portion 22, and connects lower ends of the front wall portion 22A and the rear wall portion 22B together in the vehicle front rear direction.

Figure 3:
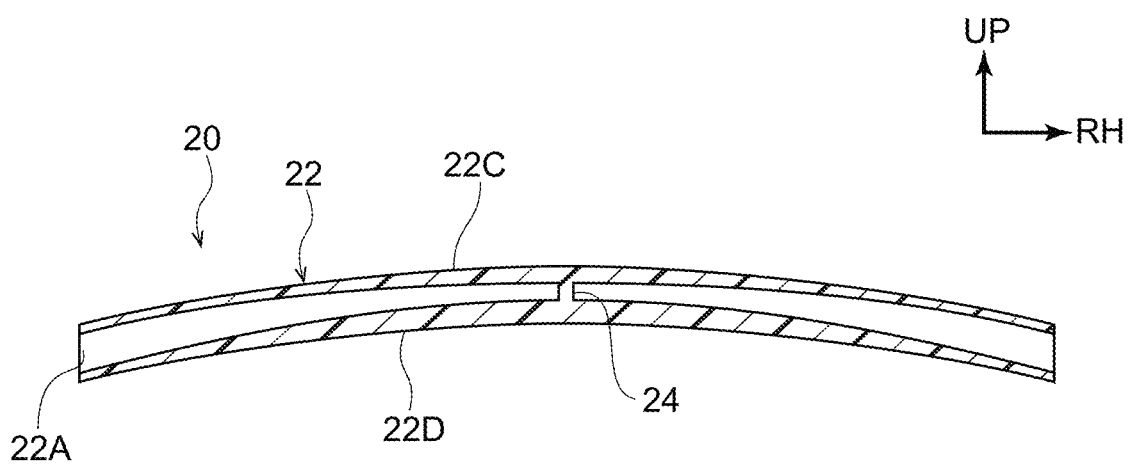
FIG. 3 is a cross-sectional view showing a cross-section across a line 3-3 shown in FIG. 1 of the reinforcement for a vehicle.

A cross-section of the main body portion 22 taken across the vehicle width direction is shown in FIG. 3. As is shown in FIG. 3, plate thicknesses of the upper wall portion 22C and the lower wall portion 22D of the main body portion 22 gradually change so as to become thicker from the end portions thereof in the vehicle width direction towards the central portion. Accordingly, an area of the cross-section of the main body portion 22 taken across the vehicle front-rear direction is set so as to become progressively larger from the end portions in the vehicle width direction of the main body portion 22 towards the central portion thereof. Accordingly, the bending rigidity and bending strength of the central portion are greater compared to the bending rigidity and bending strength of the end portions in the vehicle width direction.

Note that, in the present exemplary embodiment, a structure is employed in which the outer configuration and the size of the cross-section in the vehicle front-rear direction of the main body portion 22 are formed so as to remain constant overall, thereby ensuring that the main body portion 22 has a uniform thickness from one side portion to another side portion thereof.

A first partition wall 24 is provided in an internal portion of the main body portion 22 in an intermediate portion thereof in the vehicle width direction. This first partition wall 24 is disposed so that a plate thickness direction thereof extends substantially in the vehicle width direction, and the internal portion of the main body portion 22 is divided into one side and another side in the vehicle width direction by this first partition wall 24. The bending rigidity and bending strength of the central portion of the main body portion 22 are strengthened by this first partition wall 24.

The roof R/F 20 having the above-described structure is formed using a resin material, and the above-described main body portion 22 is molded integrally with the first partition wall 24. More specifically, the material used to form the roof R/F 20 is a fiber reinforced resin (FRP: Fiber Reinforced Plastic) containing discontinuous fibers as a reinforcing material. In the present exemplary embodiment, carbon fibers or glass fibers or the like can be used as the discontinuous fibers. In addition, this roof R/F 20 is manufactured via an SMC molding process (described below).

Next, a method of manufacturing the above-described roof R/F 20 using an SMC (Sheet Molding Compound) molding process will be described using FIG. 5. SMC molding is a process in which an SMC base material in a sheet form is loaded into a mold. The SMC base material is then compressed and heated so as to flow inside the mold and become molded into a desired shape. Note that the SMC base material is created by mixing a curing agent, a thickening agent, an internal mold release agent, and a filling agent and the like into a resin in paste form, and then impregnating this resin with discontinuous fibers. The resulting resin is then heated under predetermined conditions so as to form a thickened sheet material.

Figure 5:
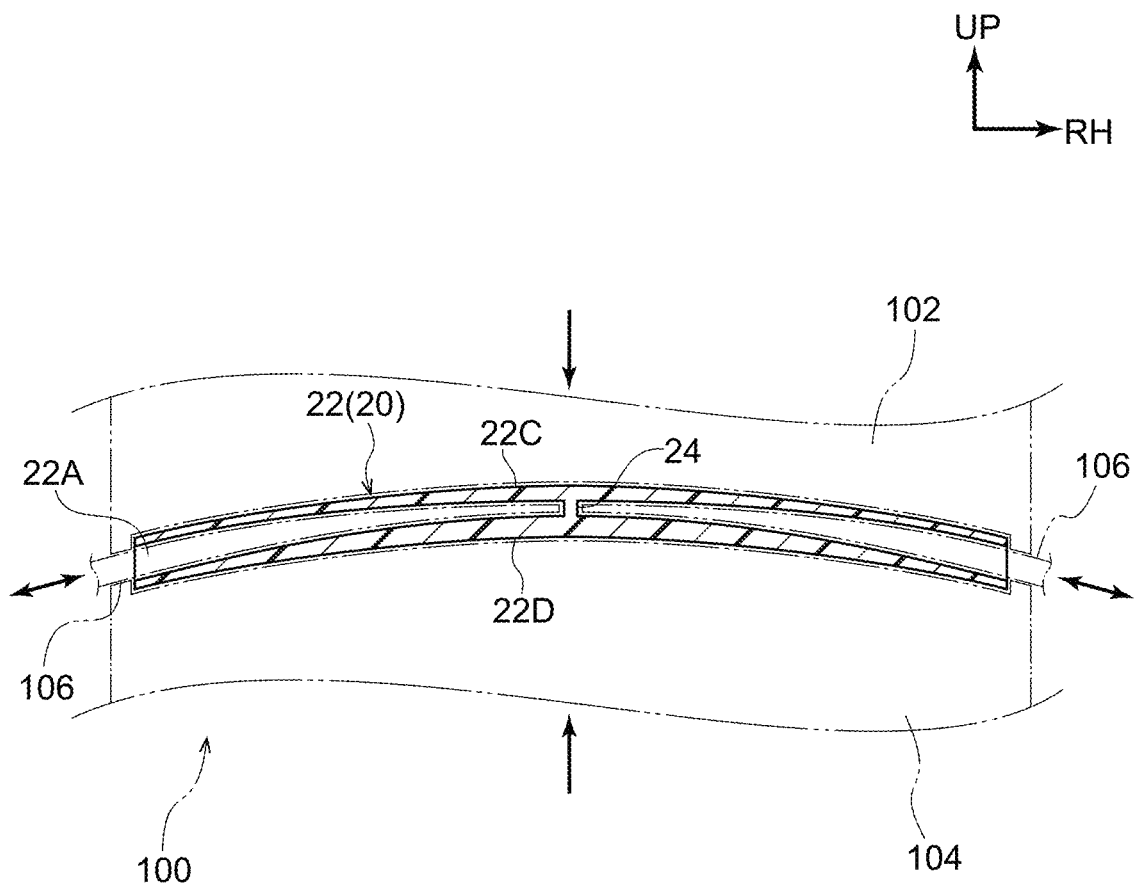
FIG. 5 is a typical view illustrating part of a method of manufacturing the reinforcement for a vehicle according to the present exemplary embodiment.

As is shown in FIG. 5, a mold 100 that is used for the SMC molding process is provided with an upper mold 102 and a lower mold 104 that are mutually superimposed in an up-down direction. When the upper mold 102 and the lower mold 104 are mutually superimposed, a cylindrical space portion is formed on the internal side of the upper mold 102 and the lower mold 104. In addition, a pair of mandrels 106 that are capable of being inserted from both sides of the mold 100 are disposed in this space portion. Each mandrel 106 is formed in a substantially rectangular prism shape, and is tapered so as to become progressively narrower from a base end portion towards a distal end (i.e., towards the center of the mold) thereof.

In the steps to manufacture the roof R/F 20, firstly, the sheet-shaped SMC base material (not shown in the drawings) is loaded into the interior portion of the mold 100. This SMC base material is then compressed and heated so as to flow inside the tightly sealed mold and fill the space between the upper mold 102, the lower mold 104, and the mandrels 106. In this step, a predetermined gap is provided between the pair of mandrels 106, and a portion of the fluid SMC base material also fills this gap as well. Thereafter, once the curing of the SMC base material is complete, the pair of mandrels 106 are extracted from inside the mold. The molded SMC base material is then removed from the upper mold 102 and the lower mold 104, at which point the manufacturing process is completed. In this way, a structure is employed in which an area of the cross-section of the main body portion 22 of the roof R/F 20 taken across the vehicle front-rear direction becomes progressively larger from the end portions in the vehicle width direction towards the central portion thereof. In addition, the SMC base material that has flowed into the gap between the pair of mandrels 106 forms the first partition wall 24 that is provided inside the main body portion 22.

(Actions and Effects)

As has been described above, the roof R/F 20 of the present exemplary embodiment is provided with the main body portion 22 that is formed in a hollow beam shape. Because of this, compared with a reinforcement that is formed in a plate shape, it is possible, while inhibiting any increase in plate thickness, to guarantee cross-sectional rigidity and also achieve a reduction in weight.

It should be noted that, as is shown in FIG. 1 and FIG. 2, the main body portion 22 of the roof R/F 20 extends in the vehicle width direction and both end portions thereof in the vehicle width direction are supported by the pair of roof side-rails 14 of the vehicle. In other words, the roof R/F 20 bridges the gap between the pair of roof side-rails 14 in the vehicle width direction. Because of this, bending moment is generated in the end portions in the vehicle width direction of the main body portion 22, and stress becomes concentrated in the central portion thereof.

Here, the main body portion 22 is formed such that an area of a cross-section thereof across the vehicle front-rear direction becomes progressively larger from the end portions in the vehicle width direction towards a central portion thereof. More specifically, the plate thicknesses of the upper wall portion 22C and the lower wall portion 22D of the main body portion 22 gradually change so as to become thicker from the end portions in the vehicle width direction towards the central portion. As a result of this, it is possible, while inhibiting any increase in the weight of the main body portion 22, to efficiently increase the bending rigidity and bending strength of this central portion where the stress is concentrated.

Moreover, in the present exemplary embodiment, the first partition wall 24 is provided in the central portion in the vehicle width direction inside the main body portion 22. This first partition wall 24 is disposed such that the plate thickness direction thereof extends substantially in the vehicle width direction, and is formed so as to partition the main body portion into one side and another side in the vehicle width direction. As a result, the bending rigidity and bending strength of the central portion of the main body portion 22 are strengthened by the first partition wall 24, and it is possible to efficiently reinforce the portion where the stress is concentrated.

In addition, in the main body portion 22 of the present exemplary embodiment, the outer configuration and the size of the cross-section taken across the vehicle front-rear direction are formed so as to remain substantially constant. Because of this, there is no increase in the complexity of the overall configuration, and the design of the roof R/F 20 can remain simple.

Moreover, the roof R/F 20 of the present exemplary embodiment is molded using a resin material containing discontinuous fibers as a reinforcing material. Because of this, the main body portion of the roof R/F 20 can be integrally molded using an SMC molding process. Consequently, it becomes easy to gradually change the area of the cross-section of the reinforcement for a vehicle to match a desired position in the vehicle width direction. As a result, not only is it possible to stably increase the bending rigidity and bending strength of the central portion, but it is also possible to produce the reinforcement for a vehicle at low cost.

Moreover, in the present exemplary embodiment, the roof R/F 20 and the pillars 16 are joined together via the joining components 18 and the roof side-rails 14. As a result, because the roof R/F 20 is supported by the roof side-rails 40 and the pillars 16, the supporting rigidity of the roof side-rails 14 can be increased.

Figure 6:
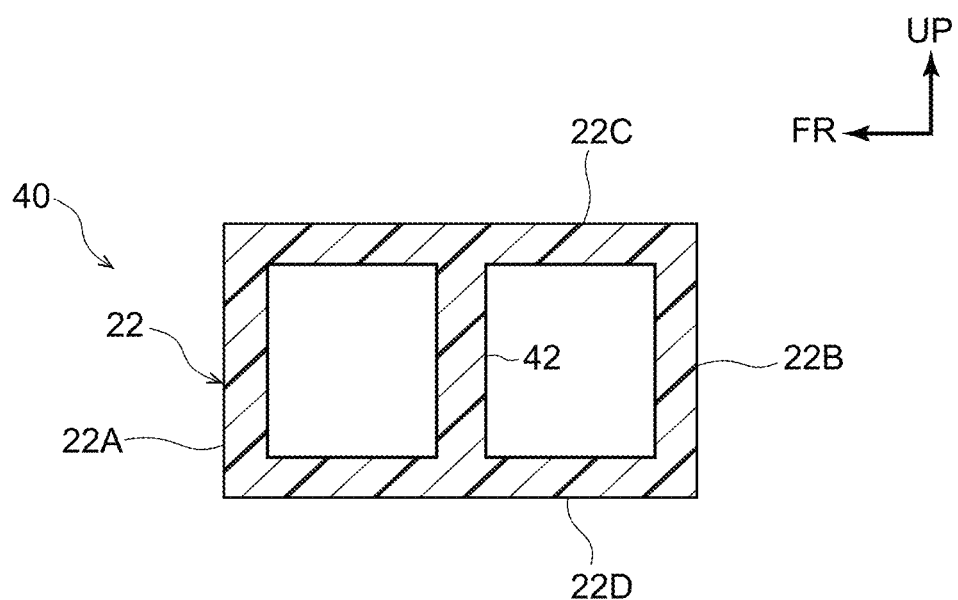
FIG. 6 is a cross-sectional view corresponding to FIG. 4 showing a reinforcement for a vehicle according to a second exemplary embodiment.

Hereinafter, a roof reinforcement 40 serving as a reinforcement for a vehicle according to a second exemplary embodiment will be described using FIG. 6. As is shown in FIG. 6, the roof reinforcement 40 of the present exemplary embodiment differs from the roof R/F 20 according to the first exemplary embodiment in being provided with a second partition wall portion 42. The remaining structure is the same as that of the roof R/F 20 of the first exemplary embodiment.

The second partition wall portion 42 is molded integrally with the main body portion 22 forming part of the roof reinforcement 40, and is disposed such that a thickness direction thereof extends substantially in the vehicle front-rear direction. This second partition wall portion 42 is formed having a uniform plate thickness, and connects the upper wall portion 22C and lower wall portion 22D of the main body portion 22 together. Additionally, the second partition wall portion 42 extends in the vehicle width direction from one end portion to another end portion in the vehicle width direction of the main body portion 22. As a result, the interior of the roof reinforcement 40 is partitioned into a vehicle front portion and a vehicle rear portion by the second partition wall portion 42.

(Actions and Effects)

According to the above-described structure, the interior portion of the main body portion 22 is partitioned by the second partition wall portion 42 that is provided so as to extend in the vehicle width direction from one end portion to the other end portion in the vehicle width direction. As a result, the configuration of a cross-section taken across the vehicle front-rear direction of the main body portion 22 is formed in a lattice configuration, so that the cross-sectional rigidity of the entire reinforcement for a vehicle can be increased.

Figure 7:
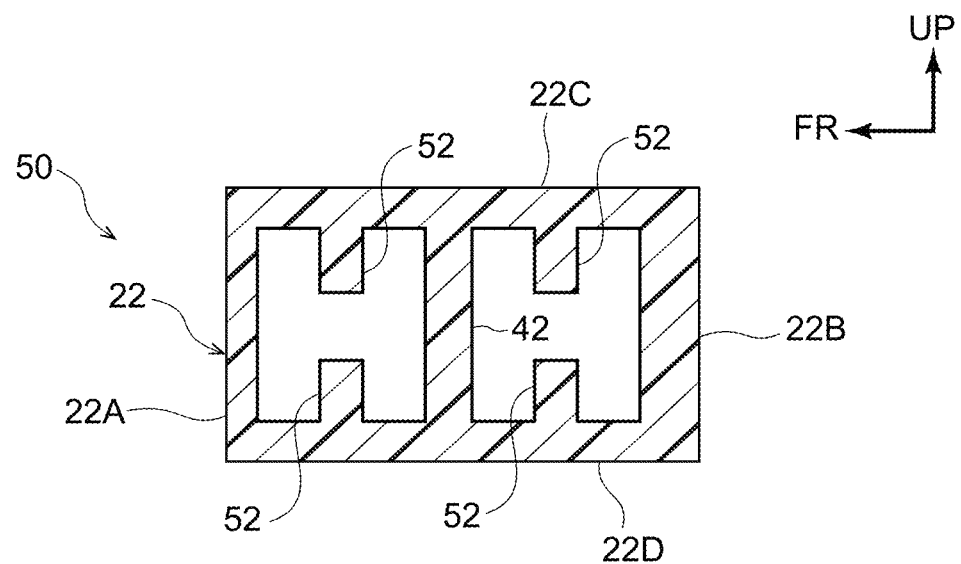
FIG. 7 is a cross-sectional view corresponding to FIG. 4 showing a reinforcement for a vehicle according to a third exemplary embodiment.

Hereinafter, a roof reinforcement 50 serving as a reinforcement for a vehicle according to a third exemplary embodiment will be described using FIG. 7. As is shown in FIG. 7, the roof reinforcement 50 of the present exemplary embodiment differs from the roof reinforcement 40 according to the second exemplary embodiment in that reinforcing ribs 52 are provided inside the main body portion 22. The remaining structure is the same as that of the roof reinforcement 40 of the second exemplary embodiment.

The ribs 52 are molded integrally with the internal portion of the main body portion 22 forming part of the roof reinforcement 50. In the present exemplary embodiment, a single rib 52 is provided respectively on each of the upper wall portion 22C and the lower wall portion 22D on both the vehicle front side and the vehicle rear side of the second partition wall portion 42. In other words, a pair of ribs 52 that are disposed opposite each other in the vehicle up-down direction are provided on each of the vehicle front side and the vehicle rear side of the second partition wall portion 42. These ribs 52 are disposed such that a plate thickness direction thereof extends substantially in the vehicle front-rear direction, and such that the height direction thereof extends in the vehicle up-down direction. In addition, these ribs 52 extend in the vehicle width direction front one end portion in the vehicle width direction of the main body portion 22 to the other end portion thereof (Actions and Effects)

According to the above-described structure, the bending rigidity and bending strength over the entire vehicle width direction of the main body portion 22 can be increased by the ribs 52.

(Supplementary Description)

The structures according to each of the above-described exemplary embodiments may also be combined in appropriate combinations.

In each of the above-described exemplary embodiments, a structure is employed in which the plate thicknesses of the lower wall portion 22C and the upper wall portion 22D of the roof reinforcements 20, 40, and 50 are gradually changed so as to change the area of the cross-sections in the vehicle front-rear direction of the roof reinforcements 20, 40, and 50. However, the present invention is not limited to this. It is also possible to employ a structure in which the plate thickness of at least one wall portion from among the front wall portion 22A, the rear wall portion 22B, the upper wall portion 22C, and the lower wall portion 22D that form the main body portion 22 is increased from the end portions in the vehicle width direction towards the center thereof.

Moreover, in each of the above-described embodiments, the roof reinforcements 20, 40, and 50 that bridge the gap between intermediate portions of the roof side-rails 14 are described, however, the roof reinforcement for a vehicle of the present invention is not limited to this. For example, it is also possible to employ a structure in which the roof reinforcement bridges the gap between front end portions or rear end portions of the roof side-rails 14.

Furthermore, in each of the above-described embodiments, a roof reinforcement that reinforces the roof 12A is described for the roof reinforcements 20, 40, and 50, however, the present invention is not limited to this. It is also possible for the reinforcement for a vehicle to be in the form of bumper reinforcement that reinforces a vehicle front bumper or a vehicle rear bumper that are disposed at a front portion or a rear portion of a vehicle. In this case, the structural component of a vehicle of the present invention is a pair of side-members that extend in the vehicle front-rear direction and that are disposed a predetermined distance apart from each other in the vehicle width direction. In this structure, the two end portions of the reinforcement for a vehicle are supported by the end portions in the vehicle front-rear direction of the pair of side-members. In this case as well, because stress is concentrated in the central portion in the vehicle width direction of the reinforcement for a vehicle that is bridging the gap between the pair of left and right side-members, it is possible to efficiently reinforce the reinforcement for a vehicle by increasing the plate thickness of this central portion (i.e., the area of the cross-section).

In each of the above-described exemplary embodiments, a structure is employed in which the outer configuration and size of the cross-section in the vehicle front-rear direction of the main body portion 22 are formed so as to remain substantially constant, however, the present invention is not limited to this. For example, it is also possible for the outer configuration and size of the cross-section in the vehicle front-rear direction of the main body portion 22 to be formed so as to become progressively larger from the central portion thereof in the vehicle width direction towards the end portions.

In addition, in each of the above-described exemplary embodiments, the roof reinforcements 20, 40, and 50 are formed from a fiber-reinforced resin material, however, the present invention is not limited to this. It is also possible for the reinforcement for a vehicle to be formed using a resin material that does not contain a fibrous reinforcing material. In this case as well, compared with a reinforcement for a vehicle that is formed from metal, it is still possible to achieve both a reduction in weight as well as efficient improvements in rigidity and strength.

In the above-described second exemplary embodiment and third exemplary embodiment, a single second partition wall portion 42 is provided inside the main body portion 22, however, the present invention is not limited to this. It is also possible for two or more second partition wall portions 42 to be provided inside the main body portion 22. Furthermore, the second partition wall portion 42 may also be formed so as to connect the front wall portion 22A and the rear wall portion 22B of the main body portion 22 together in the vehicle front-rear direction.

Moreover, in the above-described third exemplary embodiment, the ribs 52 are formed integrally with the upper wall portion 22C and the lower wall portion 22D of the main body portion 22. However, the present invention is not limited to this. It is also possible to employ a structure in which, for example, for the ribs 52 are formed integrally with the front wall portion 22A and the rear wall portion 22B of the main body portion 22. In addition, the number of ribs 52 can be altered as is appropriate.

Exemplary embodiments of the present disclosure have been described above, however, the present disclosure is not limited to these. Various modifications and the like may be made to the present disclosure insofar as they do not depart from the spirit or scope of the present disclosure.

What is claimed is:

1. A reinforcement for a vehicle, the reinforcement comprising:
   a main body portion that is formed in a hollow beam shape, wherein
   the main body portion extends in a vehicle width direction while having both end portions thereof in the vehicle width direction supported by structural components of the vehicle,
   the main body portion formed in the hollow beam shape has a closed cross-section in a vehicle front-rear direction,
   a wall portion of the main body portion forms the closed cross-section, and
   at least a part of the wall portion has a plate thickness increasing in the vehicle width direction from the end portions of the main body portion towards a central portion of the main body portion, and resulting in a cross-sectional surface area of the closed cross-section of the main body portion becoming progressively increased in the vehicle width direction from the end portions towards the central portion of the main body portion.

2. The reinforcement according to claim 1, wherein
   the main body portion comprises a first partition wall portion having a plate thickness direction that extends substantially in the vehicle width direction,
   the first partition wall portion partitions an internal portion of the main body portion into opposite sides in the vehicle width direction, and
   the first partition wall portion is provided at the central portion of the main body portion.

3. The reinforcement according to claim 1, wherein
   the main body portion comprises at least one rib provided at an internal portion of the main body portion, and
   the at least one rib extends in the vehicle width direction from one end portion to another end portion of the main body portion.

4. The reinforcement according claim 1, wherein
the main body portion comprises a second partition wall portion that partitions an internal portion of the main body portion, and
the second partition wall portion extends in the vehicle width direction from one end portion to another end portion of the main body portion.

5. The reinforcement according to claim 1, wherein
an outer configuration and a size of the closed cross-section of the main body portion taken along the vehicle front-rear direction remain substantially uniform.

6. A reinforcement for a vehicle, comprising a main body portion that is formed in a hollow beam shape having a closed cross-section, and extends in a vehicle width direction while having both end portions thereof in the vehicle width direction supported by structural components of a vehicle, and whose cross-sectional surface area in a vehicle front-rear direction becomes progressively larger from the end portions in the vehicle width direction towards a central portion thereof,
wherein the main body portion is molded using a resin material containing discontinuous fibers as a reinforcing material.

7. The reinforcement according to claim 1, wherein the main body portion is a molded product of a sheet molding compound (SMC) base material.

8. The reinforcement according to claim 1, wherein:
the structural components of the vehicle comprise a pair of roof side-rails that extend in the vehicle front-rear direction, and that are disposed a predetermined distance apart from each other in the vehicle width direction, and
the end portions of the main body portion are supported by the roof side-rails, and the main body portion reinforces a roof of the vehicle.

9. The reinforcement according to claim 1, wherein:
the structural components of the vehicle comprise a pair of side members that extend in the vehicle front-rear direction, and that are disposed a predetermined distance apart from each other in the vehicle width direction, and
the end portions of the main body portion are supported by the pair of side members, and the main body portion reinforces a bumper of the vehicle.

10. The reinforcement according to claim 1, wherein the main body portion is a molded product of a resin material containing discontinuous fibers as a reinforcing material.

11. A reinforcement for a vehicle, the reinforcement comprising:
a main body portion that is formed in a hollow beam shape having a closed cross-section, wherein
the main body portion extends in a vehicle width direction while having both end portions thereof in the vehicle width direction supported by structural components of the vehicle,
a cross-sectional surface area of the cross-section of the main body portion in a vehicle front-rear direction becomes progressively increased in the vehicle width direction from the end portions towards a central portion of the main body portion,
the main body portion comprises a partition wall portion having a plate thickness direction that extends substantially in the vehicle width direction,
the partition wall portion partitions an internal portion of the main body portion into opposite sides in the vehicle width direction,
the partition wall portion is provided at a central portion of the main body portion in the vehicle width direction, and
the main body portion is a molded product of a fiber reinforced resin (FRP) formed by heat-molding the FRP in a molding die, and the partition wall portion of the main body portion is formed by a pair of mandrels that are arranged inside the molding die with a gap therebetween.

* * * * *